997,409. STALLING DEVICE FOR AUTOMOBILES AND OTHER VEHICLES IN CASE OF ACCIDENT. LEO O'BRIEN, Montclair, N. J. Filed Sept. 27, 1910. Serial No. 584,029.

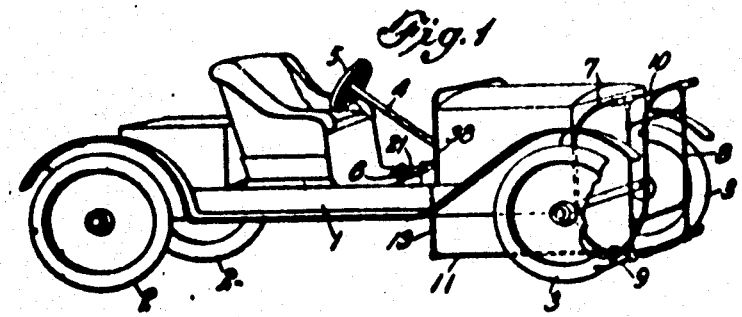
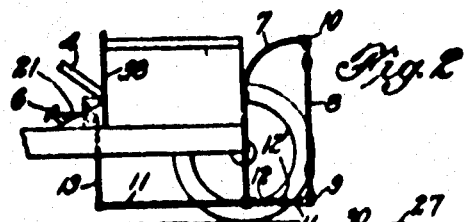
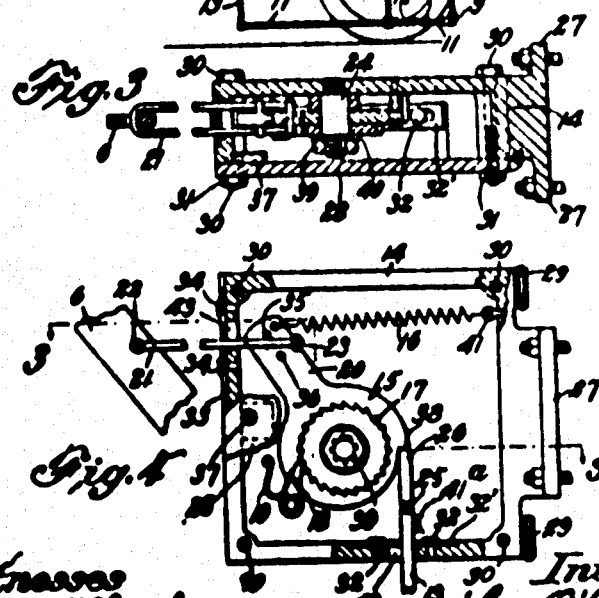

*To all whom it may concern:*

Be it known that I, LEO O'BRIEN, a citizen of the United States, residing at Montclair, in the county of Essex and State of New Jersey, have invented certain new and useful Improvements in Stalling Devices for Automobiles and other Vehicles in Case of Accident, of which the following is a specification, reference being had therein to the accompanying drawing.

This invention refers to a stalling or halting mechanism for automobiles and other rapidly moving vehicles, the object being to provide an automatic and easily-operated device, so located with respect to the car which carries it, that if the car hits an object, said device will immediately set or apply the brake and bring the car to a stop, thus preventing a car which has run down and injured or killed a person, from running away from the deed and its consequences. In thickly-populated localities it often happens that fast-driven automobiles injure and kill people on the highway and then attempt to escape by running away and ignoring the person injured or killed. When a car is equipped with my stalling device such escape is impossible, for the car is quickly stopped, and the driver is thus automatically subjected to arrest.

The invention, therefore, consists essentially in the construction, arrangement and combination of parts, substantially as will be hereinafter described and claimed.

In the accompanying drawing illustrating my invention, Figure 1 is a perspective view of an automobile provided with my improved stalling device. Fig. 2 is a detail side view of the front part of the car, showing a portion of the stopping mechanism. Fig. 3 is an enlarged section of the casing of the stalling mechanism and the inner mechanical parts of the same, on the line 3, 3, of Fig. 4. Fig. 4 is a vertical section of the same at right angles to the section in Fig. 3.

Like characters of reference designate like parts throughout all the different figures of the drawing.

1 denotes an automobile, car, or other vehicle, such as is commonly driven at high speed. It has rear wheels 2, 2, front wheels 3, 3, and the usual parts including a steering wheel 5, on rod 4, and a brake lever 6.

On the front of car 1 is suspended a movable frame that is adapted to strike against anything on the roadway which the wheels 3 would be apt to touch. Said frame is loosely carried in front of wheels 3, and consists of a convenient skeleton arrangement, including brackets 7, 7, an upper connecting rod 10, a frame 8 hung on rod 10 so as to be capable of vibration, which frame 8 has a horizontal lower rod 9 that rides close to the ground and directly in front of wheels 3. This rod 9 will collide against any object that is struck and injured by wheels 3, or either of them, and the contact of any part of this rod 9 with said object will actuate the rod by causing the latter to move toward the wheels, that is to say inwardly toward the car.

Pivoted or otherwise loosely connected to rod 9 preferably near the middle thereof, is a rearwardly-extending longitudinal rod 11, which projects under the machine and has its inner end pivoted to the lower end of a vertical lever 13, that projects upward into a casing 14 that is secured rigidly on the dashboard 38 or some other part of the car.

Casing or box 14 may vary widely in size, shape and location. It is designed to contain certain of the operating parts of my device, and to be kept securely closed and locked, and accessible only to some authorized person or official who may be provided with a key. Said casing has suitable flanges 27 for assisting in the attachment of the same to the dashboard 38 or some other part of the car. Also casing 14 has a cover or door 28, hinged at 29, 29, and provided with a lock at 37; and further the door 28 is bolted to the casing 14 by several bolts 30 — say four—which are headed at one end and provided with nuts 31 at the other end.

Inside of casing 14, on one of the walls thereof, is a stud 24 having mounted loosely thereon a circular plate 15 having an arm 20 and provided with a notch 38. The upper end 26 of lever 13, that projects into casing 14 engages the notch 38. On the end of stud 24 is a nut 39 and washer 40, so that plate 15 may revolve upon the stud 24 loosely between wall of casing 14 and said nut and washer. A stout spring 16 fastened to end of arm 20 of plate 15 and also to a staple 41 fastened in the wall of casing 14 serves to draw the plate 15 around on its supporting stud so that the notch 38 will normally rest on the end 26 of lever 13. Said lever 13 is fulcrumed on a pin 25, and turns on its fulcrum when the rod 11 moves the lever 13 backward or forward. When the lever 13 upholds the plate 15 in the position shown in Fig. 4 the spring 16 will be under tension, and when lever 13 withdraws its support, the spring 16 serves to draw the arm 20 over and away from the adjacent wall of casing 14. Likewise on the stud 24, and secured to side of plate 15 is a ratchet wheel 17, having pawl 18 provided with spring 19. When the spring 16 draws the arm 20 and plate 15 over, the ratchet 17 follows and is held by pawl 18. In the side of casing 14 near the fulcrum pin 25 is a fixed stop 41ª against which the lever 13 strikes when the end 26 of lever 13 enters the notch 38 sufficiently far. Also it will be observed that there is a connection between the arm 20 and the brake rod 6. This may be any suitable device, but I preferably employ a link 21 that passes through a hole 22 in rod 6 and also embraces the arm 20, the ends being connected by a bolt 23, and there being pins 35 and 36 in the arm 20 above and below link 21 to hold the link in place on the arm with a loose connection. When the arm 20 is actuated by the spring 16 it is evident that the link 21 will draw the brake rod 6 forward and set the brake instantly, thus stopping and stalling the automobile until the brake is released.

The casing 14 has an opening at 42 where the lever 13 passes into the casing, said opening being fitted with an adjustable slotted and perforated sliding plate 32' guided by rigid pins or screws 32; and casing 14 has also another opening 43 where the link 21 passes through the wall of the casing, said opening being fitted with an adjustable sliding slotted plate 33 guided by rigid pins or screws 34. These plates 32' and 33 enable the lever 13 and link 21 to adjust themselves in their movements.

The operation of my improved device will be clearly evident from the foregoing.

The movable front rod 9 will come into contact with any object in the roadway or elsewhere that may be struck by the car when in rapid motion, so that if, for example, a person be injured by a collision with the automobile the immediate effect will be to vibrate the front rod 9 and reciprocate the rod 11, thereby oscillating lever 13 and releasing the rotary plate 15, the result being that the brake will be applied and the machine stalled, until the result of the accident is known. Since the active mechanical parts which operate the brake rod are confined in a locked box, the brake when applied thereby, cannot be released until after the box is opened, which cannot be done except with the proper key, and this will be in the possession of some authorized inspector or other official. Thus automobile machines may be kept under complete responsibility by this method and prevented from escaping the consequences of their unlawful acts. The four bolts 30 which act with lock 37 to hold on the cover, give an additional safeguard, for they can only be removed with great difficulty. When the parts are replaced, however, in their normal position again, by returning the notched plate 15 to the place where the lever 13 may again uphold it, a spring 12 surrounding rod 11 and tensioned between a part of the frame and the collar 12' on rod 11 acts to return rod 11 and front rod 9, as well as the other parts to their normal position.

Many changes in the exact construction and arrangement of the parts may be made without departing from the invention.

What I claim is:—

1. In a device for stalling automobiles and the like, the combination of a suspended front rod, a casing, a detent therein for restraining a brake-applying mechanism, a connection between said detent and the front rod, and a ratchet and pawl for holding the brake-applying mechanism in position after it acts.

2. In a device for stalling automobiles and the like, the combination of a suspended front device, a closed casing, a notched plate therein having an arm and supported revolubly, a spring for retracting said arm, a detaining lever engaging the notched plate, and operated by a connection with the front device, and means for holding the notched plate in position after it is shifted by the spring.

3. In a device for stalling automobiles and the like, the combination of a suspended front frame, a closed casing, a revoluble notched plate therein, having an arm, a loose connection between said arm and the brake lever of the automobile, a spring for retracting said arm, a detaining lever engaging the notched plate, and connections between said detaining lever and the suspended front frame.

4. In a device for stalling automobiles and the like, the combination of a front device arranged to contact with an object struck by an automobile on the roadway, a casing and means for closing and locking the same securely, a revoluble notched plate within said casing, a pawl and ratchet, a spring connected to the said plate, a detent engaging the said plate, means whereby the detent is released when the front device strikes an object, and means for applying the brakes when the detent is released.

In testimony whereof I affix my signature in presence of two witnesses.

LEO O'BRIEN.

Witnesses:
JEANNETTE STORK,
A. L. KENT.